United States Patent [19]

Brinker et al.

[11] Patent Number: 4,723,884
[45] Date of Patent: Feb. 9, 1988

[54] APPARATUS FOR UNLOADING INDIVIDUAL REELS FROM A CARRIER MEMBER

[75] Inventors: Alfred Brinker, Gevelsberg; Uwe Dreyer, Wuppertal, both of Fed. Rep. of Germany

[73] Assignee: Maschinenfabrik Fr. Niepmann GmbH & Co., Gevelsberg, Fed. Rep. of Germany

[21] Appl. No.: 818,533

[22] Filed: Jan. 10, 1986

[30] Foreign Application Priority Data

Jan. 19, 1985 [DE] Fed. Rep. of Germany ....... 3501692

[51] Int. Cl.⁴ .................... B25J 19/02; B65G 59/02
[52] U.S. Cl. ................................ 414/120; 294/93; 294/907; 414/416; 414/908; 901/35
[58] Field of Search .............. 901/47, 46, 30, 32, 901/35; 414/908, 910, 120, 416, 121, 122, 114, 730; 294/96, 86.24, 93, 907

[56] References Cited

U.S. PATENT DOCUMENTS

| | | | |
|---|---|---|---|
| 3,007,097 | 10/1961 | Shelley et al. | 901/47 X |
| 3,850,313 | 11/1974 | Rackman et al. | 414/591 |
| 4,242,025 | 12/1980 | Thibault | 414/72 X |
| 4,247,093 | 1/1981 | Kistner et al. | 414/114 X |
| 4,299,524 | 11/1981 | Sawada et al. | 414/910 X |
| 4,415,305 | 11/1983 | Tsubuku et al. | 414/753 |
| 4,439,674 | 3/1984 | Amberny et al. | 901/47 X |
| 4,521,966 | 6/1985 | Karlsson | 901/46 X |

FOREIGN PATENT DOCUMENTS

| | | | |
|---|---|---|---|
| 33689 | 8/1981 | European Pat. Off. | |
| 45174 | 2/1982 | European Pat. Off. | 294/86.4 |
| 70950 | 2/1983 | European Pat. Off. | 294/96 |
| 3420330 | 12/1985 | Fed. Rep. of Germany | 294/907 |

Primary Examiner—Robert J. Spar
Assistant Examiner—Janice Krizek
Attorney, Agent, or Firm—Becker & Becker, Inc.

[57] ABSTRACT

An apparatus for unloading individual reels from a carrier member on which a plurality of reels are stacked next to one another in several rows, and one on top of the other in several layers. An unloading mechanism is supported on a height-adjustable frame in such a way as to be movable relative to the frame. Linear drives are provided for moving the unloading mechanism, in a plane, in two directions that extend at an angle of 90° relative to one another. Sensors are disposed on the frame for detecting reels in a given layer or plane, and for controlling the height adjustment of the frame. Further sensors are disposed on the unloading mechanism for alignment of the latter relative to a reel that is to be unloaded. With such an apparatus, the reels can be unloaded directly and fully automatically from a conventional transport device, such as a pallet, and can be supplied to a packaging machine, where they are also fully automatically secured and threaded.

7 Claims, 7 Drawing Figures

APPARATUS FOR UNLOADING INDIVIDUAL REELS FROM A CARRIER MEMBER

BACKGROUND OF THE INVENTION

1. Field of the Invention

The present invention relates to an apparatus for unloading individual reels from a carrier member on which a plurality of reels are stacked next to one another in several rows, and one on top of the other in several layers.

2. Description of the Prior Art

In many packaging machines, such as wrapping machines and tube bag machines, the packaging material, such as paper, aluminum foil, plastic sheets, or laminates, are consumed from spools, which are also known as reels. These reels must generally be manually placed in front of an unwinding device, be loaded on the latter, and subsequently be secured thereon.

Since with regard to increasing the speed of such packaging machines, the lifting, loading, and securing of the reels on the unwinding device cannot be expected of the predominantly female operators, apparatus were developed for holding a supply of reels for a longer operating time, with the reels being loaded onto the unwinding device next to one another. The drawback of such a heretofore known apparatus is that it must be manually loaded and controlled.

An object of the present invention is to provide an apparatus with which reels can be removed directly and fully automatically from a conventional transport device, such as a pallet, and can be supplied to a packaging machine, where the reels are similarly fully automatically secured and threaded.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 2:
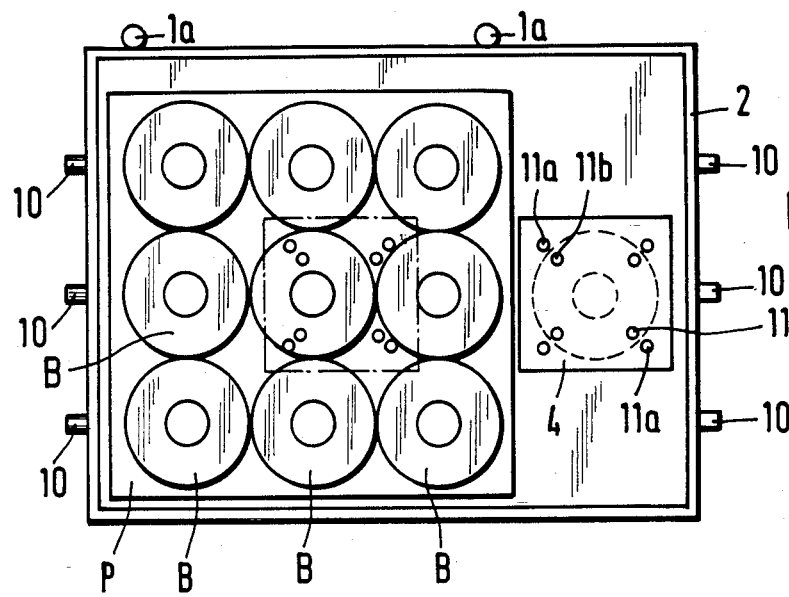
FIG. 2 is a plan view of the apparatus of FIG. 1.

The apparatus of the present invention comprises: a frame, the height of which relative to the pallet is adjustable; an unloading mechanism that is supported on the frame in such a way as to be movable relative thereto; linear drive means for moving the unloading mechanism, in a plane, in two directions that extend at an angle of 90° relative to one another; first sensors disposed on the frame for detecting reels in a given layer or plane, and for controlling the height adjustment of the frame; and second and third sensor means disposed on the unloading mechanism for alignment of the latter relative to a reel that is to be unloaded.

By means of the unloading mechanism, the inventive apparatus is in a position to efficiently and precisely grasp a respective reel from a plurality of reels that are stacked on a carrier member next to one another in several rows, and on top of one another in several layers. Such a reel is either supplied directly to the unwinding device of a subsequently arranged packaging machine, or is supplied to a transport system that transports reels either to an unwinding device or to a storage mechanism disposed ahead of the unwinding device.

Pursuant to a further specific feature of the present invention, the unloader can be in the form of a holding mandrel having a cylindrical body that conforms to the inner diameter of the sleeve of the reels, and that is provided with holding elements that can be adjusted in the radial direction. This results in a particularly simple holding of the individual reels. Pursuant to an inventive proposal for simplifying the introduction of the body of the unloading mechanism into a reel sleeve, the body can be provided with a conical extension.

Pursuant to a preferred embodiment of the present invention, the sensors disposed on the frame are embodied as light barriers that are respectively associated with a given row of reels. With the aid of these light barriers, it is possible to determine the next reel in the uppermost layer.

Pursuant to a further feature of the present invention, disposed above the body of the unloading mechanism is at least one pair of sensors, with one of the sensors of a given pair being spaced from the central axis of the cylindrical body by a distance that is less than the radius of a reel that is to be grasped, and the other sensor of a given pair being spaced from the central axis by a distance that is greater than the radius of the reel. Thus, with the aid of these sensor pairs, it is possible to position the cylindrical body of the unloading mechanism exactly over the sleeve of the reel that is to be grasped, with this being done prior to lowering the height adjustable frame, along with the unloading mechanism, for the purpose of grabbing hold of that reel.

Pursuant to one possible embodiment of the present invention, these sensors are disposed on a supporting arm that is rotatable about the central axis of the cylindrical body. In this case, it is sufficient to have only a single pair of such sensors, inasmuch as due to the rotation of the supporting arm, the sensors detect the entire periphery of the reel.

Pursuant to an alternative embodiment of the present invention, at least two pairs of sensors, and preferably four pairs of sensors, are disposed on a mounting plate that is secured to the body. This embodiment involves a rigid arrangement of the sensor pairs relative to the body of the unloading mechanism.

So that the inventive apparatus can be used with reels of varying diameter, it is proposed pursuant to a further feature of the present invention that the position of the sensors be adjustable relative to the central axis of the housing in conformity with the respective outer diameter of the reels.

Finally, it is proposed pursuant to the present invention on the conical extension of the body to dispose supplementary sensors that cooperate with the sleeve of the reel for fine correction of the unloading mechanism.

DESCRIPTION OF PREFERRED EMBODIMENTS

Referring now to the drawings in detail, the illustrated exemplary embodiment of the inventive apparatus includes a support structure 1, which in this embodiment comprises a horizontal support part that rests upon the ground, and a vertically extending support part that is mounted to the horizontal part. A frame 2 is guided on the vertical support part in such a way that the height of the frame 2 can be adjusted. For this purpose, two guide rods 1a are secured to the vertical portion of the support structure 1. The frame 2 is guided on the guide rods 1a via guide elements 2a. In the illustrated embodiment, the adjustment of the height of the frame 2 is effected by two chains or toothed belts 2b that are secured to the frame and are guided by guide rollers 1b on the support structure 1. These toothed belts 2b are driven synchronously by a motor 3 that is secured to the support structure 1, with a shaft 3a of the motor driving a given one of the guide rollers 1b of each of the toothed belts 2b.

Figure 1:
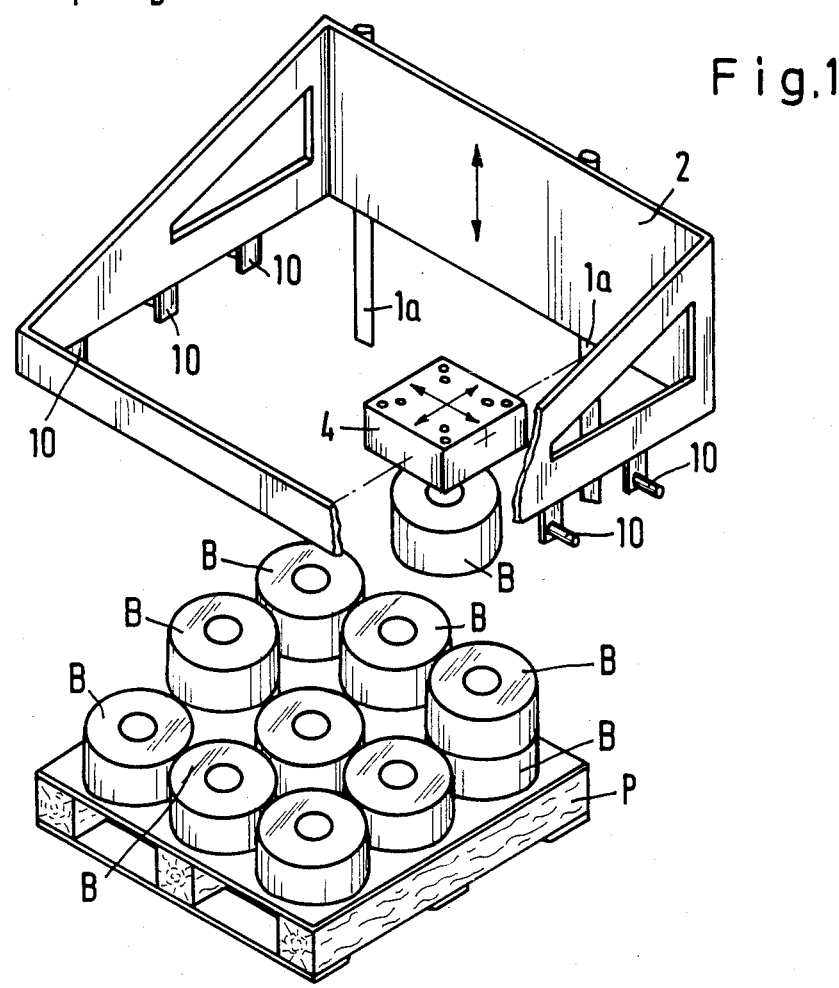
FIG. 1 is a perspective partial view of one embodiment of the inventive apparatus during the process of unloading individual reels from a pallet.
Figure 3:
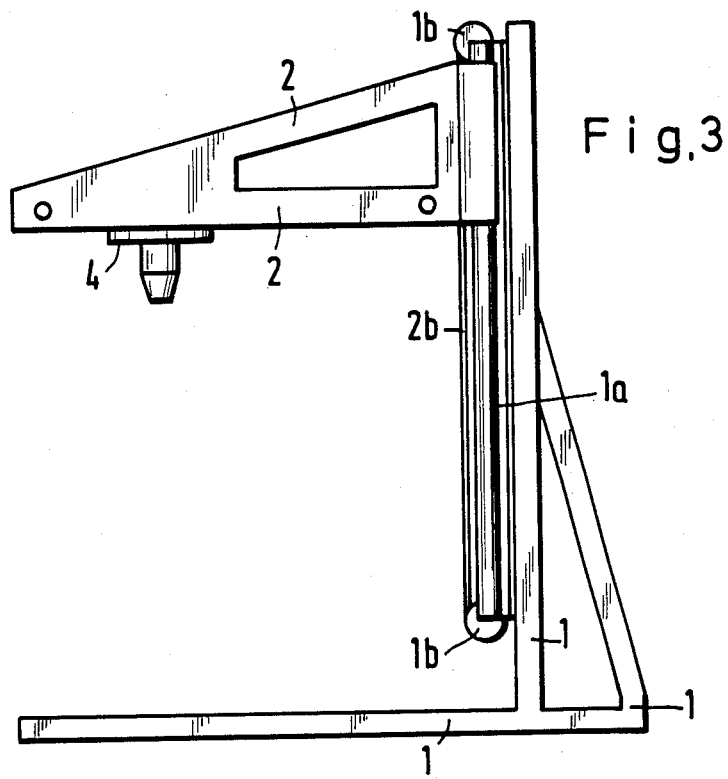
FIG. 3 is a side view of the complete apparatus of FIG. 2.
Figure 4:
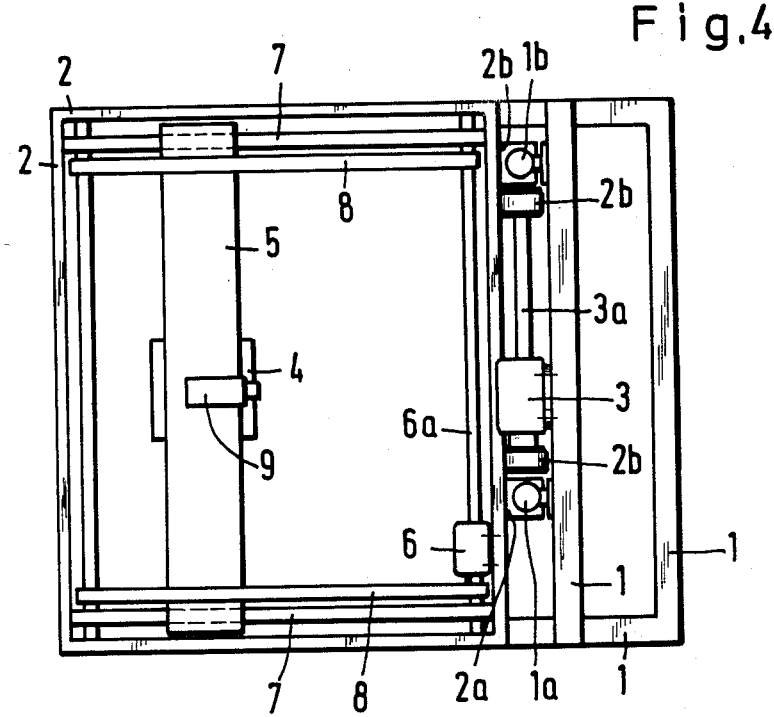
FIG. 4 is a plan view of the inventive apparatus schematically illustrating the drive mechanism.

As indicated schematically in FIG. 1, and as illustrated via an exemplary embodiment in FIG. 4, an unloading mechanism 4, also called an unloader, is provided on the height-adjustable frame 2. The unloader 4 can be moved in the plane of the frame 2 by linear drive mechanisms that extend at an angle of 90° relative to one another. In the embodiment illustrated in FIG. 4, the unloader 4 is disposed on a crossbar or traverse 5. This traverse 5 can be moved along, and in the longitudinal direction of, the frame 2 by a motor 6. For this purpose, the traverse 5 can be moved on guides 7. Movement is again effected by chains or toothed belts 8 that are guided over guide rollers on the frame 2, with a respective one of the guide rollers of each of the toothed belts being driven by a shaft 6a of the motor 6.

Adjustment of the unloader 4 at right angles to the movement of the traverse 5 is effected by guiding the unloader 4 along the underside of the traverse 5, as indicated in FIG. 4. This movement of the unloader 4, which is effected in the transverse direction of the frame 2, is achieved with the aid of a motor 9. These two described directions of movement of the unloader 4 extend at right angles to one another, and are indicated in FIG. 1 by dot-dash lines and by the crossed arrows.

In order to be able to individually unload reels B that are stacked on a pallet P in several adjacent rows and on top of one another in several layers, as shown in FIG. 1. the frame 2 is lowered from its upper starting position with the aid of the motor 3. Disposed on the frame 2 are several light barriers 10, each of which is associated with a given row of the reels B. The light barriers 10 stop the downward movement of the frame 2 as soon as the unloader 4 has reached a plane above the uppermost layer of reels B. The unloader 4 is now moved out of its starting position, which is indicated in FIG. 2 by a solid line, and is moved over the reels B that are to be unstacked. This is accomplished by a movement of the unloader 4 beneath the traverse 5, and by a movement of the traverse 5 relative to the frame 2.

Figure 5:
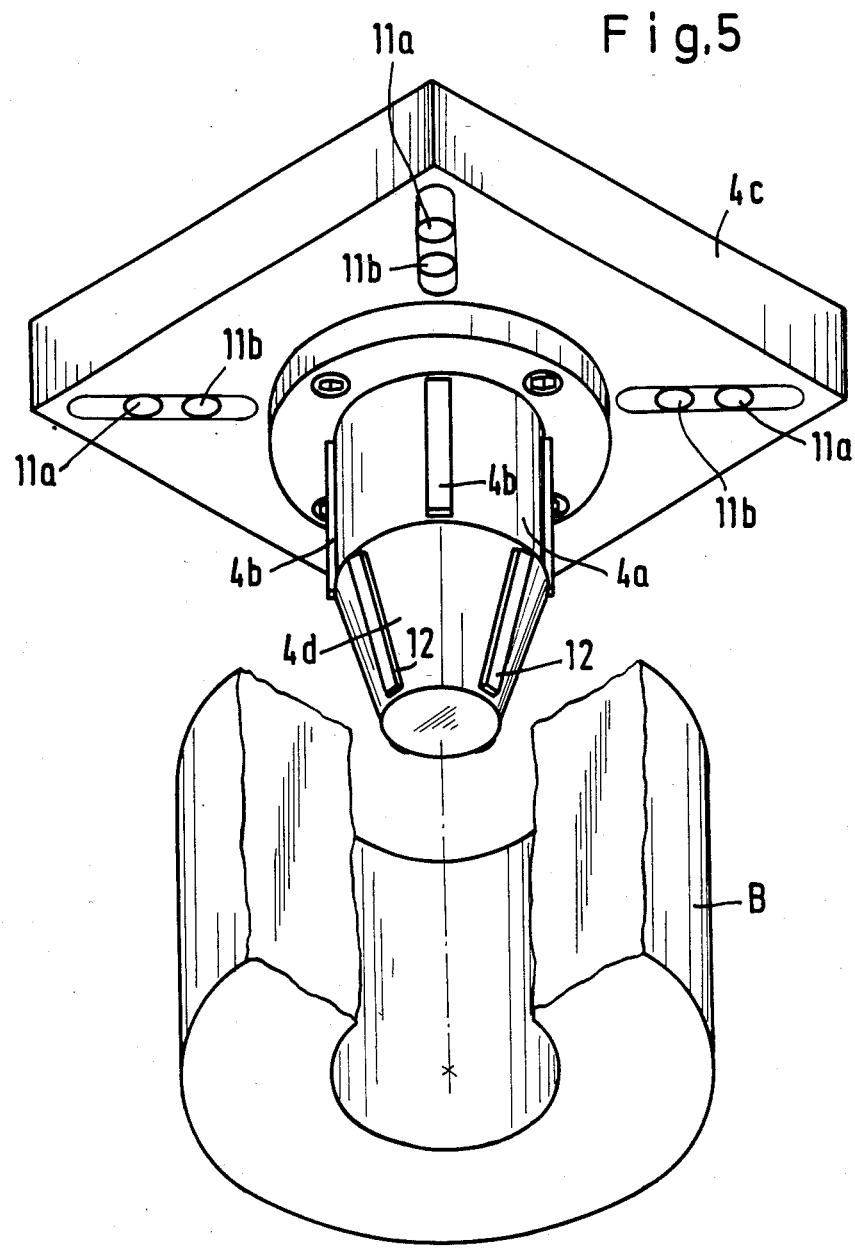
FIG. 5 is a perspective view of one inventive embodiment of the unloader, with sensors being fixedly mounted thereon.

As best seen in FIG. 5, in this embodiment the unloader 4 is embodied as a holding mandrel having a cylindrical body 4a that conforms to the inner diameter of the sleeves of the reels. The body 4a is provided with holding elements 4b that can be adjusted in the radial direction. In order to be able to introduce the body 4a, with its holding elements 4b, into the sleeve of a reel, the embodiment of FIGS. 1-5 is provided with a mounting plate 4c that is disposed above the body 4a. In this embodiment, four pairs of sensors 11a and 11b are disposed on the mounting plate 4c. The unloader 4 is moved in a controlled manner in the two directions of movement that extend at 90° relative to one another until the radially outwardly disposed sensors 11a of the sensor pairs indicate a clear area, and the inwardly disposed sensors 11b signal the presence of a reel B that is to be taken hold of. In this situation, which is illustrated in FIG. 5, the frame 2 along with the unloader 4 is lowered, so that the body 4a of the unloader 4 enters the sleeve of the reel. By extending the holding elements 4b, the reel B is then grasped, and is lifted from the pallet P by raising the frame 2. The reel B is then supplied for further consumption, for example by returning the unloader 4 to the starting position illustrated in FIG. 2. In this position, the respective reel B can be released by retracting the holding elements 4b, and can be transferred to a subsequent transport mechanism that is not illustrated in the drawing.

In order to allow for a fine correction of the unloader 4 during introduction of the body 4a of the unloader into the sleeve of the reel, in the illustrated embodiment the cylindrical body 4a of the unloader 4 is provided with a conical extension 4d on which are disposed supplementary sensors 12. With the aid of these supplementary sensors 12, a fine correction can be effected during lowering of the unloader 4 into the sleeve of the reel.

Figure 7:
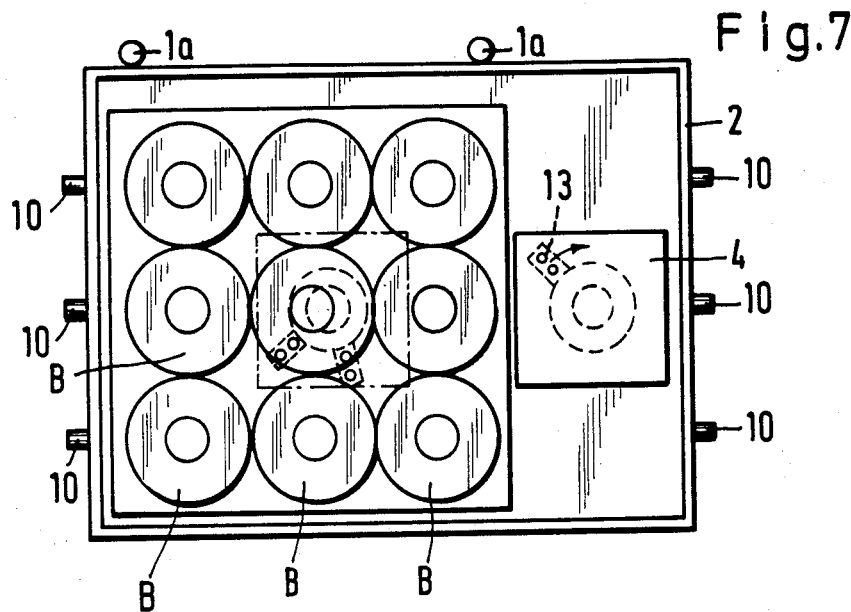
FIG. 7 is a plan view of the inventive apparatus provided with an unloader of the type illustrated in FIG. 6.
Figure 6:
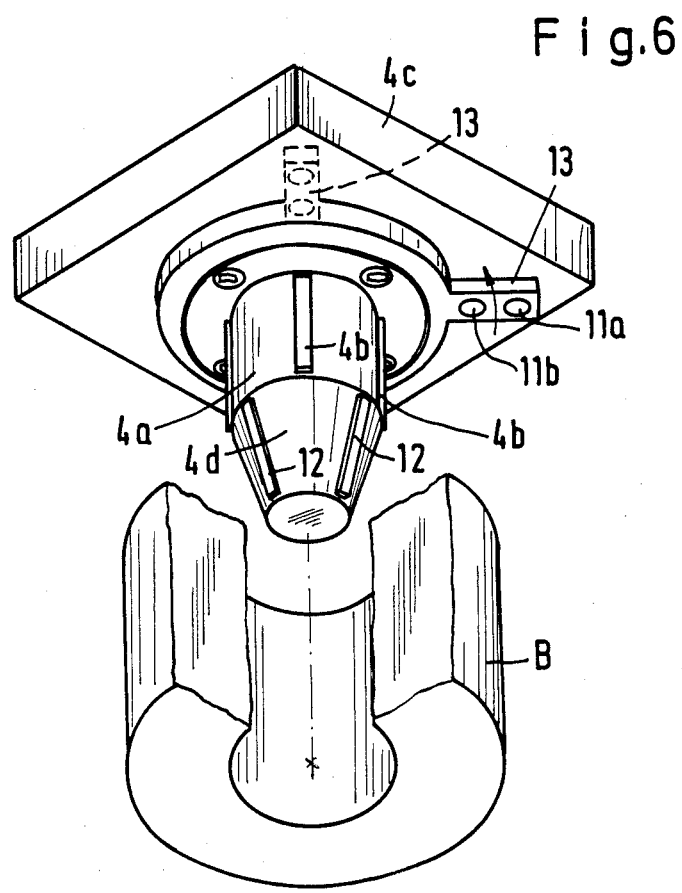
FIG. 6 is a perspective view of an alternative embodiment of the inventive unloader.

In a second embodiment of the unloader 4 illustrated in FIGS. 6 and 7, in place of several pairs of sensors 11a and 11b disposed on a mounting plate 4c, there is provided only one sensor pair 11a and 11b that is disposed on a supporting arm 13. This supporting arm 13 rotates in the direction of the arrow shown in FIGS. 6 and 7, so that the provision of only a single pair of sensors 11a and 11b is sufficient for determining the exact position of the unloader 4 above a reel B. This position is achieved when during a complete revolution of the supporting arm 13, the inwardly disposed sensor 11b continuously detects a reel B, and the outer sensor 11a, with the exception of brief interruptions due to adjacent reels B, continuously indicates clear areas.

With the inventively described apparatus, all of the reels B of a pallet P can be successively grasped and fed to a subsequent transport mechanism that either supplies the reels B directly to a subsequently arranged packaging machine, or supplies the reels to an intermediate stack from which individual reels B are supplied to the packaging machine as needed.

The present invention is, of course, in no way restricted to the specific disclosure of the specification and drawings, but also encompasses any modifications within the scope of the appended claims.

What we claim is:

1. An apparatus for unloading individual reels from a carrier member on which a plurality of reels having a longitudinal direction are stacked next to one another in several rows, and one on top of the other in several layers; said apparatus comprising:

a frame, the height of which relative to said carrier member and relative to the longitudinal direction of the reels is adjustable;

an unloading mechanism that is supported on said frame in such a way as to be movable relative thereto for gripping of the reels;

linear drive means for moving said unloading mechanism, in a plane, in two directions that extend at an angle of 90° relative to one another;

sensor means for control of movement of said unloading mechanism including first light-barrier sensors disposed on said frame for protecting the reels in a given layer, and for controlling the height adjustment of said frame; and at least one pair of second and third sensor means disposed on said unloading mechanism for alignment of the latter relative to a reel that is to be unloaded, said unloading mechanism being in the form of a holding mandrel having a cylindrical body that conforms to an inner diameter of said reels, and that is provided with holding elements that are adjustable in the radial direction; said first sensors being in the form of light barriers that are respectively associated with given ones of said rows of reels; said at least one pair of second and third sensor means being disposed on a mounting means; in each pair of said second and third sensor means, said second sensor means being disposed on the mounting means to operate contactless at a distance from the central axis of said cylindrical body that is greater than the radius of a reel that is to be unloaded, and said third sensor means being disposed at a distance from the central axis of said body that is less than the radius of said reel that is to be unloaded.

2. An apparatus according to claim 1, which includes a mounting plate having an underside included with said mounting means, and which includes at least two pairs of second and third sensor means disposed on said underside of said mounting plate, said cylindrical body also being secured to the underside of said mounting plate.

3. An apparatus according to claim 2, which includes four pairs of second and third sensor means disposed on said underside of said mounting plate.

4. An appartus according to claim 2, in which the position of said second and third sensor means is adjustable relative to the central axis of said cylindrical body in conformity wiht the outer diameter of a reel that is to be unloaded.

5. An apparatus for unloading individual reels from a carrier member on which a plurality of reels having a longitudinal direction are stacked next to one another in several rows, and one on top of the other in several layers; said apparatus comprising:

a frame, the height of which relative to said carrier member and relative to the longitudinal direction of the reels is adjustable;

an unloading mechanism that is supported on said frame in such a way as to be movable relative thereto for gripping of the reels;

linear drive means for moving said unloading mechanism, in a plane, in two directions that extend at an angle of 90° relative to one another;

first light-barrier sensors disposed on said frame for detecting the reels in a given layer, and for controlling the height adjustment of said frame;

one pair of second and third sensor means disposed on said unloading mechanism for alignment of the latter relative to a reel that is to be unloaded, said unloading mechanism being in the form of a holding mandrel having a cylindrical body that conforms to an inner diameter of said reels, and that is provided with holding elements that are adjustable in the radial direction; said first sensors being in the form of light barriers that are respectively associated with given ones of said rows of reels; said one pair of second and third sensor means being disposed on a mounting means; in said pair of said second and third sensor means, said second sensor means being disposed on the mounting means to operate contactless at a distance from the central axis that is greater than the radius of a reel that is to be unloaded, and said third sensor means being disposed at a distance from the central axis of said body that is less than the radius of said reel that is to be unloaded; and a single pair of second and third sensor means disposed on a supporting arm that is rotatable about the central axis of said cylindrical body.

6. An apparatus according to claim 5, in which the position of said second and third sensor means is adjustable relative to the central axis of said cylindrical body in conformity with the outer diameter of a reel that is to be unloaded.

7. An apparatus for unloading individual reels from a carrier member on which a plurality of reels having a longitudinal direction are stacked next to one another in several rows, and one on top of the other in several layers; said apparatus comprising:

a frame, the height of which relative to said carrier member and relative to the longitudinal direction of the reels is adjustable;

an unloading mechanism that is supported on said frame in such a way as to be movable relative thereto for gripping of the reels;

linear drive means for moving said unloading mechanism, in a plane, in two directions that extend at an angle of 90° relative to one another;

first light-barrier sensors disposed on said frame for detecting the reels in a given layer, and for controlling the height adjustment of said frame;

at least one pair of second and third sensor means disposed on said unloading mechanism for alignment of the latter relative to a reel that is to be unloaded, said unloading mechanism being in the form of a holding mandrel having a cylindrical body that conforms to an inner diameter of said reels, and that is provided with holding elements that are adjustable in the radial direction; said first sensors being in the form of light barriers that are respectively associated with given ones of said rows of reels; at least one pair of second and third sensor means being disposed on a mounting plate secured to said body; in each pair of said second and third sensor means, said second sensor means being disposed to operate contactless at a distance from the central axis of said cylindrical body that is greater than the radius of a reel that is to be unloaded, and said third sensor means being disposed at a distance from the central axis of said body that is less than the radius of said reel that is to be unloaded; and the position of said second and third sensor means being adjustable relative to the central axis of said cylindrical body in conformity with the outer diameter of a reel that is to be unloaded;

said body of said holding mandrel being provided with a conical extension having supplementary sensors provided therewith that cooperate with the inner diameter of a given reel for fine correction of said holding mandrel.

* * * * *